(No Model.)  6 Sheets—Sheet 1.
D. B. MORISON.
APPARATUS FOR HEATING LIQUIDS BY MEANS OF STEAM.
No. 529,288.  Patented Nov. 13, 1894.
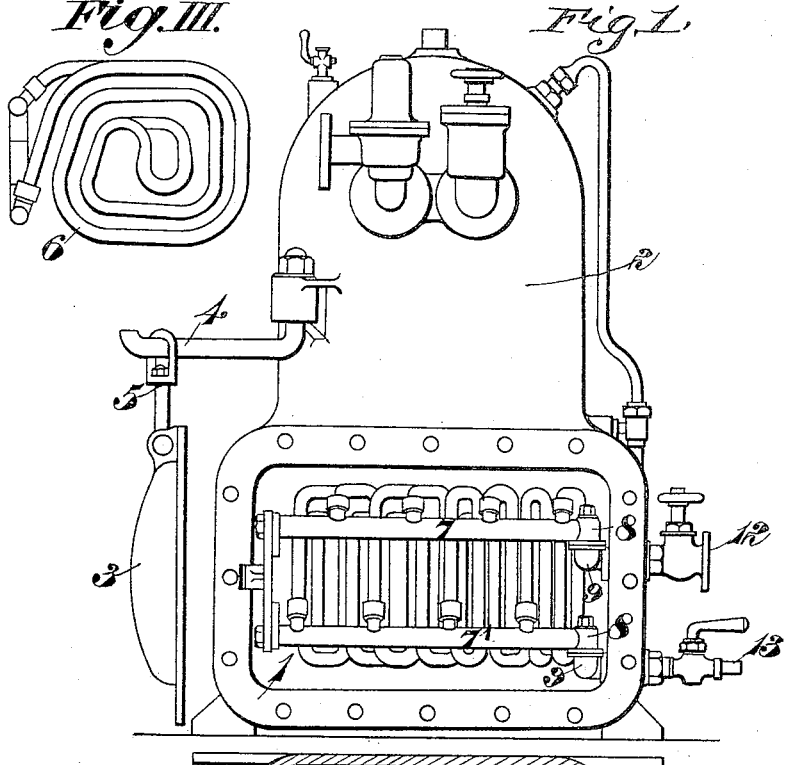
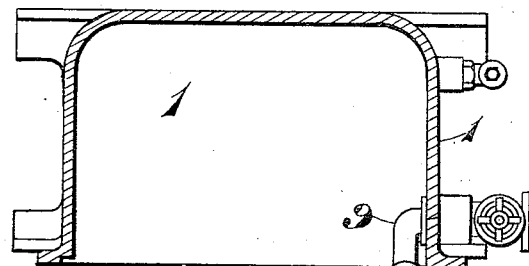
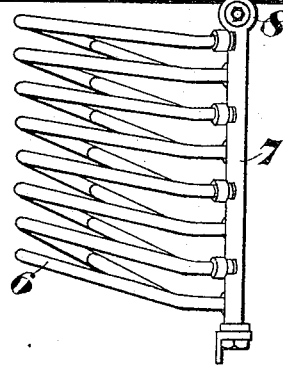
Witnesses
L. D. Wingate.
H. W. Downes.
Inventor
D. B. Morison

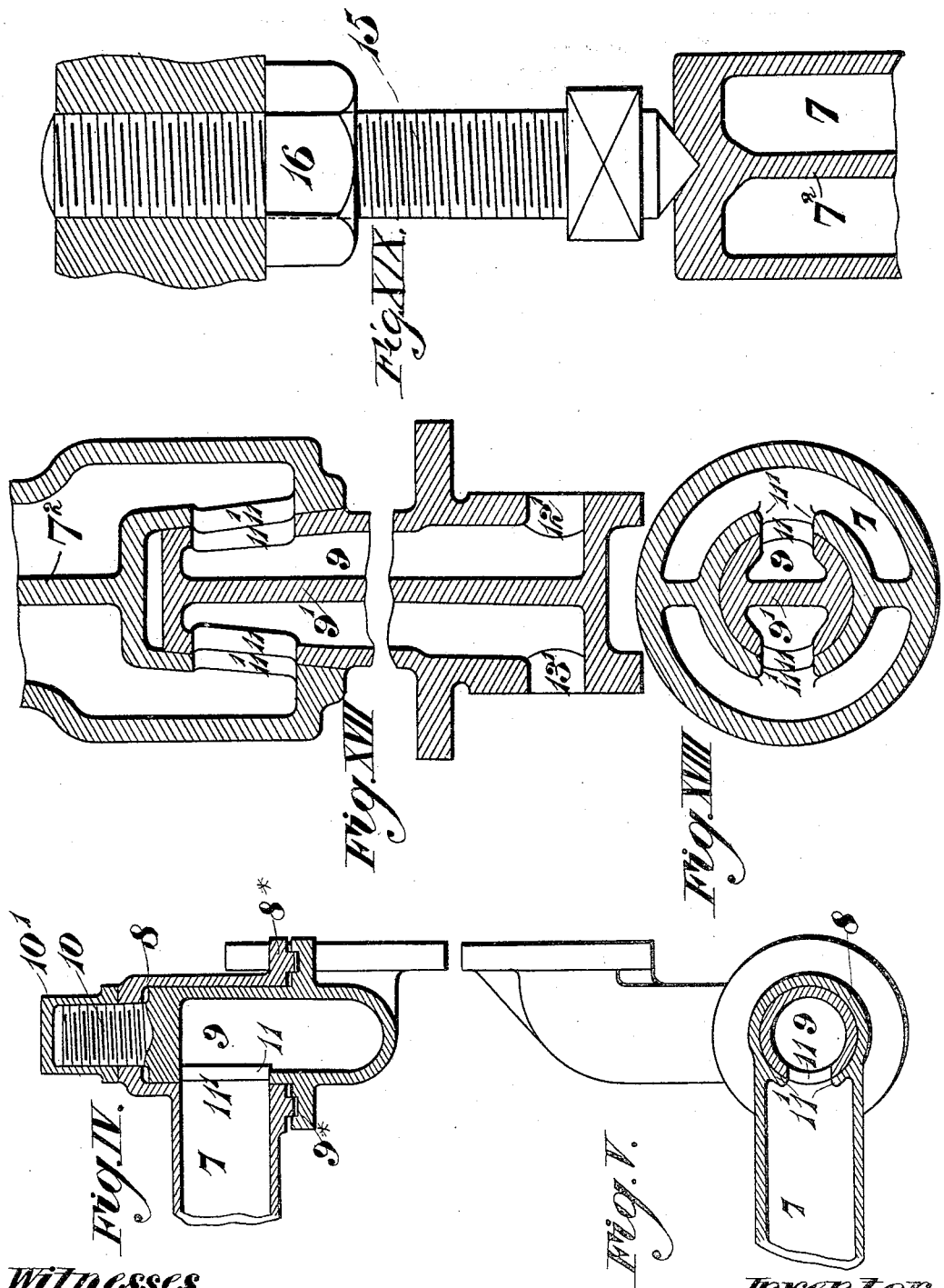

(No Model.) 6 Sheets—Sheet 3.
D. B. MORISON.
APPARATUS FOR HEATING LIQUIDS BY MEANS OF STEAM.
No. 529,288. Patented Nov. 13, 1894.
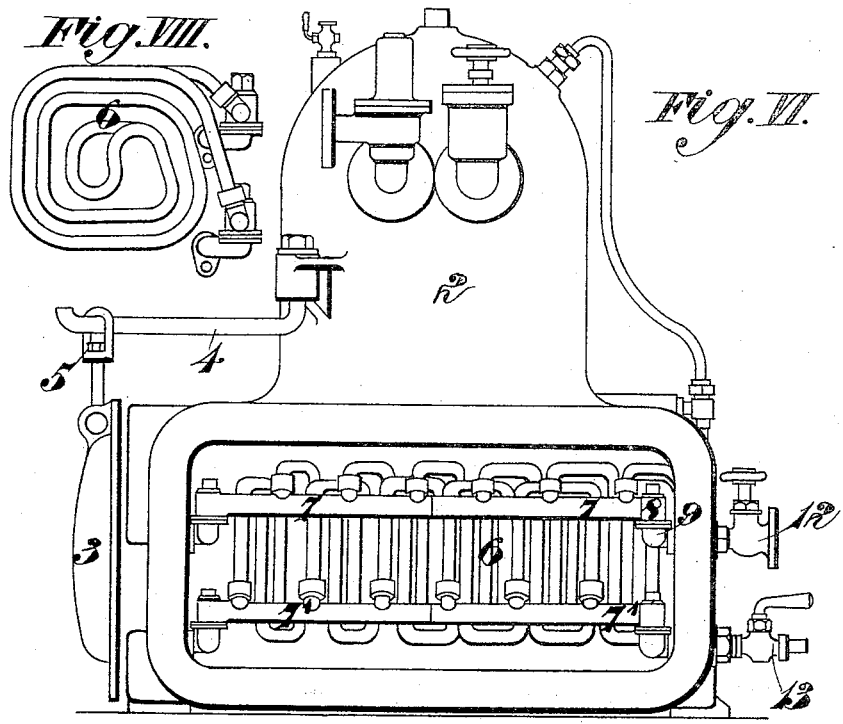
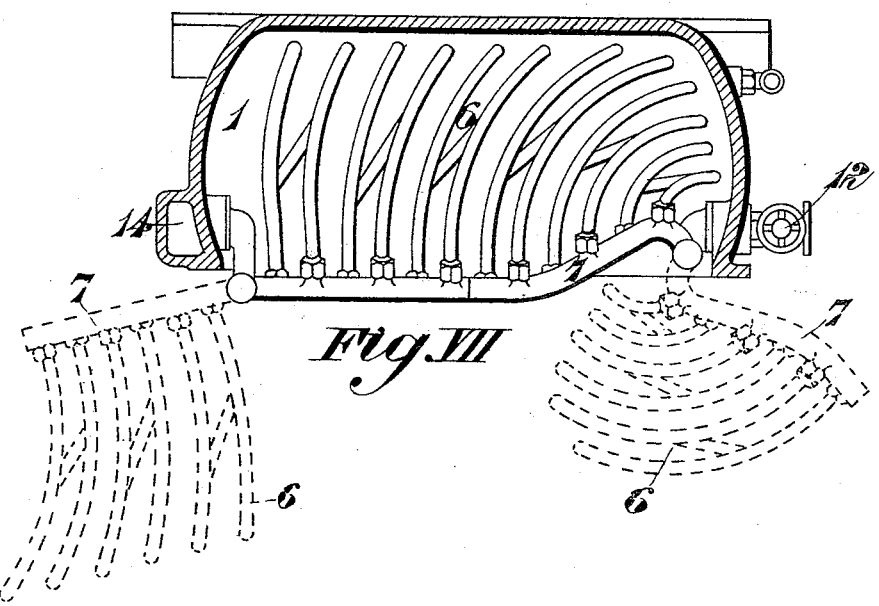
Witnesses
L. D. Wingate.
H. W. Downes.
Inventor
D. B. Morison
THE NORRIS PETERS CO., PHOTO-LITHO., WASHINGTON, D. C.

(No Model.) 6 Sheets—Sheet 4.
D. B. MORISON.
APPARATUS FOR HEATING LIQUIDS BY MEANS OF STEAM.
No. 529,288. Patented Nov. 13, 1894.
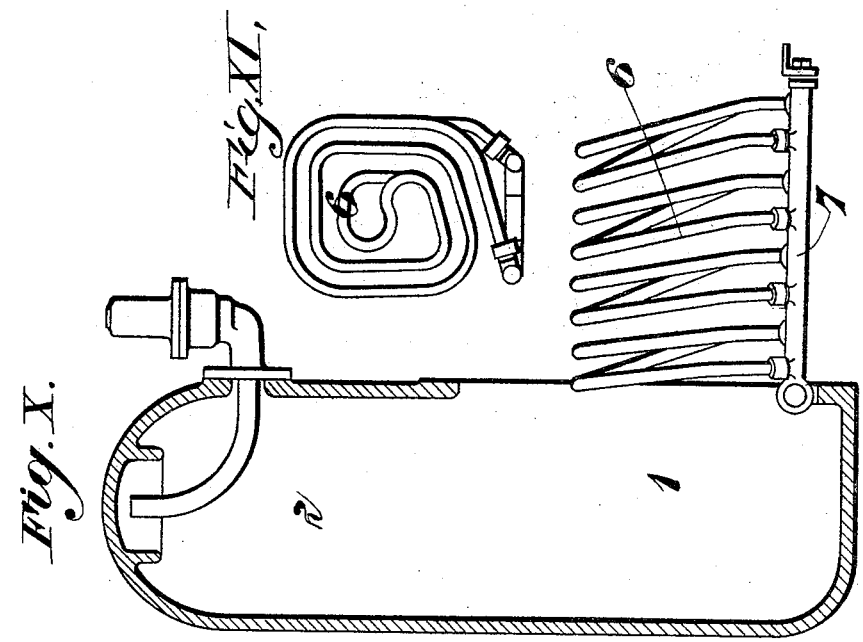
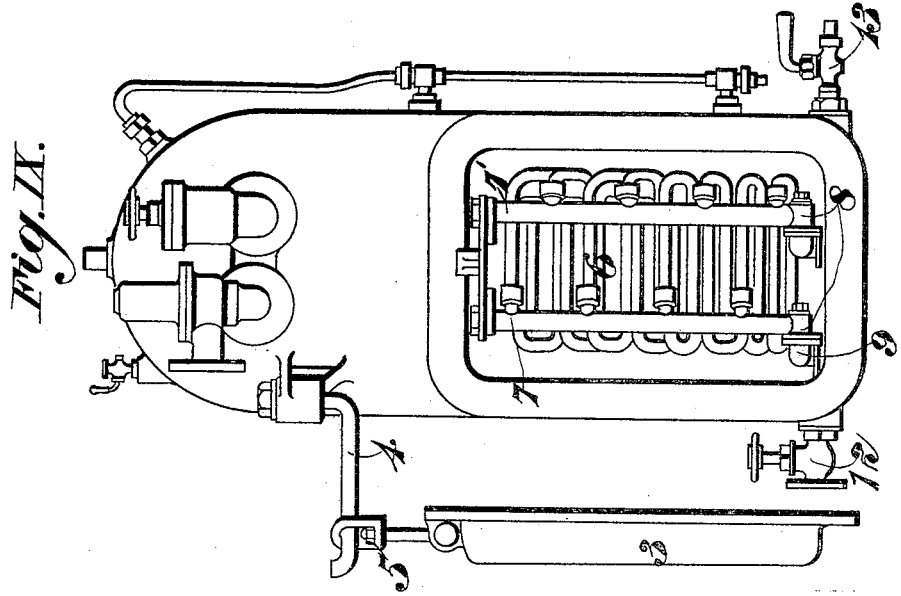

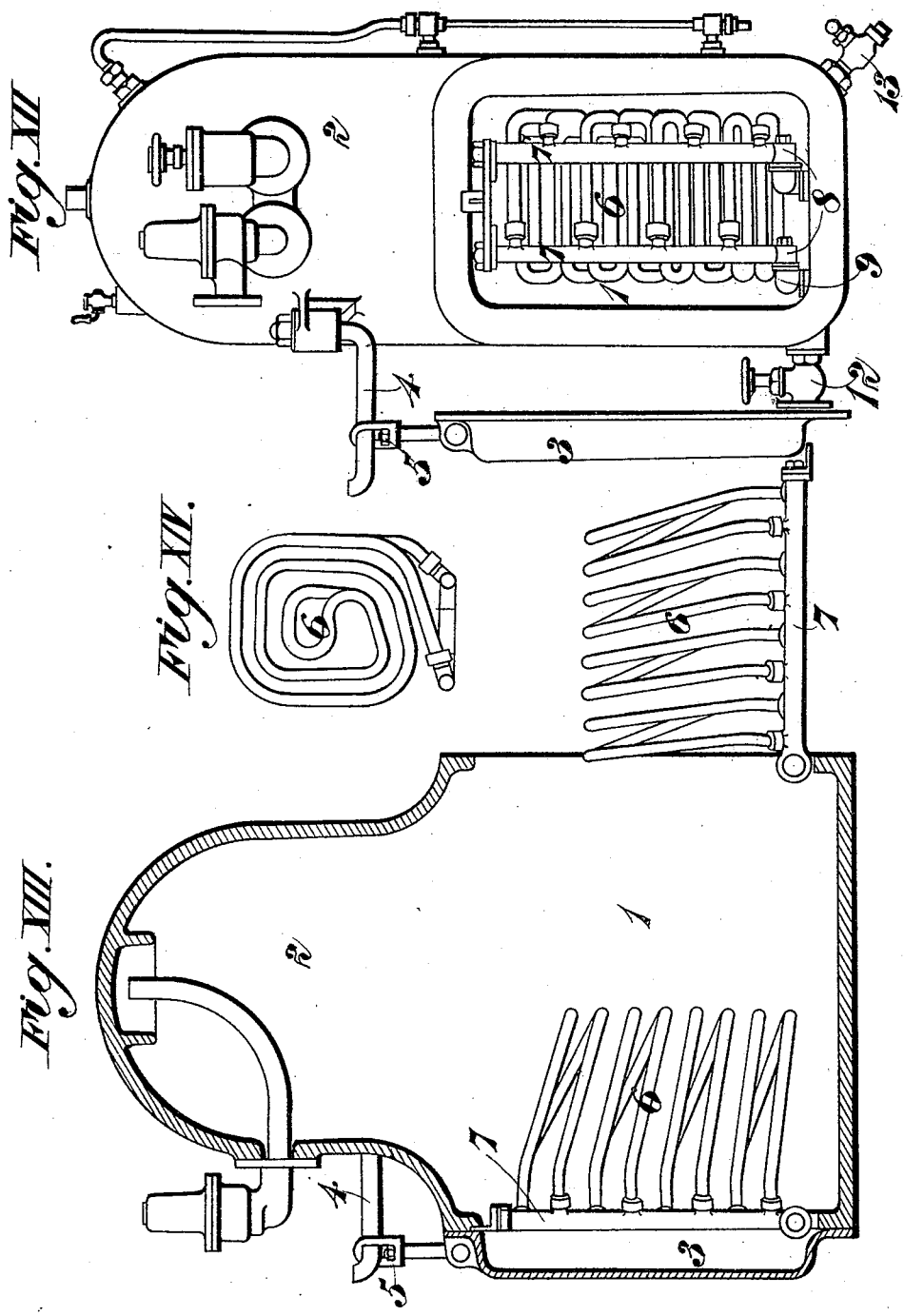

(No Model.)  6 Sheets—Sheet 6.
D. B. MORISON.
APPARATUS FOR HEATING LIQUIDS BY MEANS OF STEAM.
No. 529,288. Patented Nov. 13, 1894.
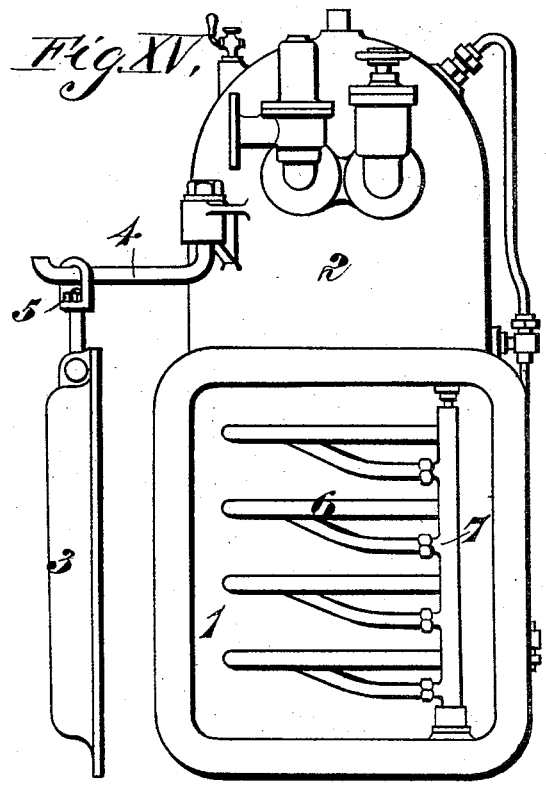
Fig. XV.
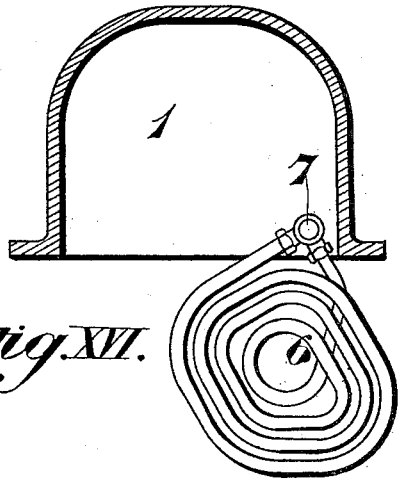
Fig. XVI.
Witnesses
L. D. Wingate.
H. W. Downes.
Inventor
D. B. Morison

UNITED STATES PATENT OFFICE.

DONALD BARNS MORISON, OF HARTLEPOOL, ENGLAND.

APPARATUS FOR HEATING LIQUIDS BY MEANS OF STEAM.

SPECIFICATION forming part of Letters Patent No. 529,288, dated November 13, 1894.

Application filed January 2, 1894. Serial No. 495,409. (No model.) Patented in France November 11, 1893, No. 234,006; in Norway November 30, 1893, No. 3,516, and in Belgium December 4, 1893, No. 107,470.

*To all whom it may concern:*

Be it known that I, DONALD BARNS MORISON, a subject of the Queen of Great Britain and Ireland, residing at Hartlepool, in the county of Durham, England, have invented Improvements in and Relating to Apparatus for Heating or Evaporating Liquids by Means of Steam, (and for which Letters Patent have been granted in France, dated November 11, 1893, No. 234,006; in Norway, dated November 30, 1893, No. 3,516, and in Belgium, dated December 4, 1893, No. 107,470,) of which the following is a specification.

My invention of improvements in and relating to apparatus for heating or evaporating liquids by means of steam has reference *inter alia*, to an improved arrangement of the heating coils in such apparatus whereby such coils can be readily withdrawn from the evaporating vessel for cleaning, or other purposes, and so that one set of heating coils can if desired, be readily removed from the apparatus and replaced by another set. For this purpose the heating coils are connected to one or more tubes constituting the inlet passage or passages for the heating steam and the outlet passage or passages for the resulting water of condensation, and such tube or tubes is or are connected to a hollow plug or plugs in such a manner that on the door with which the vessel is provided for obtaining access to its interior being removed, the tube or tubes on which the coils are mounted can be revolved on the hollow plug or plugs as a center until the coils are moved outside the vessel and into a position affording facilities for examination and cleaning. When in this position the tubes and coils constituting the heating surface of the apparatus may be readily lifted off the hollow plugs and replaced if required by another set, thus rendering it possible to quickly and easily replace a set of coils on which scale has formed with a clean set. When one tube and one plug are employed the tube and plug are divided so as to constitute the inlet and outlet passages. When two tubes are employed one forming the inlet to the coils and the other the outlet therefrom, the tubes are preferably arranged outside the coils or near to the door of the vessel the coils being mounted on the tubes in such a manner that they can be removed from the tubes if necessary. The coils may be of any shape, and may be arranged in pairs, one coil of each pair being connected to the inlet tube and the other coil of the pair being connected to the outlet tube, thus allowing the coils freedom of movement and affording facilities for connecting them to the tubes. The vessel containing the liquid to be heated or evaporated may be of any suitable form, but that portion of the vessel containing the coils is preferably in the form of a horizontal cylinder one side of which is provided with a door for obtaining access to the interior, and on this horizontal cylinder may be arranged a steam dome in the form of a vertical cylinder, the whole forming the heating or evaporating vessel which is provided with the usual fittings to constitute a complete evaporating apparatus. In order to facilitate the removal of the door I provide on the vessel a pivoted arm or bracket to which the door is attached by a link, so that on the bolts which hold the door to the vessel being removed, the door may be swung by means of the pivoted arm or bracket to one side of the vessel, or to a position which will permit of the heating coils being withdrawn from the vessel.

The accompanying drawings show my invention applied to apparatus suitable for evaporating salt or impure water by means of steam.

Figure I is a front elevation of the apparatus with the door removed. Fig. II is a sectional plan of the same with the coils withdrawn from the vessel, and in a position for cleaning or removal. Fig. III is an end elevation of the tubes and coils when lifted from off the plugs. Fig. IV is a vertical section; and Fig. V a sectional plan of a hollow cap and plug hereinafter referred to. Figs. VI, VII and VIII are similar views to Figs. I, II and III respectively illustrating a modified construction. Figs. IX, X and XI and Figs. XII, XIII, and XIV are respectively similar views to Figs. I, II and III, illustrating modified constructions of the apparatus. Figs. XV and XVI are similar views to Figs. I and II, illustrating a further modified arrangement; and Figs. XVII, XVIII, and XIX are enlarged sectional detail views of parts thereof.

The several figures are drawn to different scales.

The evaporating vessel shown in Figs. I and II, is in the form of a horizontally arranged vessel 1 provided with a vertical cylindrical extension 2 having a spherical top and forming a steam dome. The cylinder 1 is fitted with a removable door 3 which can be swung by a pivoted arm or bracket 4 to which it is attached by a link 5, into such a position as will enable the heating coils 6 to be readily withdrawn from the said cylinder 1. The heating coils 6 which are arranged vertically in pairs, one of which is seen in face view in Fig. III, are detachably connected to two horizontal tubes 7 7' that form respectively the inlet and outlet for the heating steam employed and the resulting water of condensation. Each of these tubes is closed at one end and terminates at the other end in a cap 8 arranged to fit on a hollow plug 9 as shown in Figs. IV and V.

The plug is adapted to be attached to the vessel 1, and may be either conical, or parallel as shown, the joint being made by the junction of the flanges 8* and 9* on the cap and plug respectively. The upper end of the plug is provided with a screw threaded stem 10 fitted with a nut 10' so that on the cap being placed on the plug, the requisite pressure for making a steam tight joint can be obtained by tightening the said nut. In each plug, and also in the cap therefor, are ports or passages 11 and 11' respectively, corresponding to each other, so that when the coils are within the vessel there is a free passage for steam or water between the hollow plugs and the tubes 7, 7', and coils 6.

12 is a steam valve controlling the flow of steam to the upper plug and tube 7, and 13 is a cock controlling the discharge from the lower tube 7' and plug 9.

In the modified arrangement shown in Figs. VI and VII, the tubes 7 and 7' are arranged so that two pairs of them can be used, the two pairs being hinged or jointed to opposite ends of the cylinder 1 as shown. In this arrangement steam enters through the valve 12 and is thence divided into two portions, one portion entering the hollow plug 9 and tube 7 on the right hand side of the apparatus, and the other portion being conveyed by means of any suitable passage 14 cast in or on the cylinder 1, to the left hand side of the apparatus and entering the corresponding hollow plug 9 and tube 7 on that side. In a similar manner, the water of condensation is discharged through a passage corresponding with 14, on the lower left hand side of the apparatus, and from thence is discharged through the cock 13 together with the water of condensation from the right hand set of coils and pipes. Instead of a passage 14 there may be suitable pipes arranged on the outside of the apparatus for the same purpose, or, there may be two steam inlet valves 12 with corresponding outlet cocks 13. The tubes and coils may be arranged in various positions as shown in the plan Fig. VII, the object being to obtain a maximum amount of heating surface on the coils, and at the same time enable each of the two sets of coils to be removed from the apparatus independently of the other.

In the modified construction shown in Figs. IX and X, the evaporating vessel is of vertical tubular form, and the heating coils 6 (Fig. XI,) are connected to vertical tubes 7, 7' which are hinged or jointed to turn on horizontal axes so that they can be turned outward and downward as shown in Fig. X instead of outward and sidewise as in the previous arrangements.

Figs. XII, XIII and XIV illustrate an arrangement in which there are two sets of tubes and coils each arranged like the single set shown in Figs. IX and X, the casing of the evaporator in this case being provided with two doors. In this arrangement the steam may be taken from the right hand portion of the apparatus to the left hand portion, or vice versa by means of a passage, or suitable pipes arranged on the outside of the apparatus for the same purpose; or, there may be two steam inlet valves 12 with corresponding outlet cocks 13 as described with reference to Figs. VI and VII.

Figs. XV and XVI show an arrangement of the apparatus in which the heating coils 6 are connected to a single vertical tube or tubular support 7 that is provided internally with a central dividing rib $7^2$ and is mounted to rotate upon a hollow plug 9, also provided with a central division rib 9', as shown more clearly in the detail views Figs. XVII and XVIII. The plug is formed with ports or openings 11, 11 that correspond with similar ports or openings 11', 11' in the lower end of the tube 7, which is adapted to fit over the plug as shown. The heating steam enters the said plug 9 through one or other of the branches 12' or 13', and the condensed steam, after passing through the heating coils, is discharged through the opposite branch 13' or 12', as the case may be. The upper end of the tubular support is held in place by a pivot screw 15 (Fig. XIX) that enters a fixed part of the casing and is provided with an adjusting nut 16 by which the said tubular support can be tightened as desired upon the plug 9 to insure a fluid tight joint therewith.

In the various illustrations the evaporating vessel is shown as being made of cast metal. The vessel, or any part of it, may however be made of any material either cast, stamped or riveted as may be desired. The coils may also be of any desired form and any suitable number of sets thereof may be employed, according to requirements and the size of the vessel.

What I claim is—

1. Heating or evaporating apparatus provided with heating coils hinged or jointed to a fixed support or supports within the evaporating apparatus and capable of being readily swung about said support or supports into or out of the evaporating apparatus through a suitable opening normally closed by a door that is independent of said heating coils substantially as herein described for the purpose specified.

2. Heating or evaporating apparatus comprising a vessel formed with an opening normally closed by a door and provided with a steam pipe, one or more heating coils normally located within said vessel independently of said door, and a movable plug and socket joint also located within said vessel and connecting said heating coil or coils with said steam pipe and about which said coil or coils can be moved as a center so as to pass through the opening in said vessel without breaking the steam connection between said coil or coils and said steam pipe, substantially as herein described.

3. Heating or evaporating apparatus provided with heating coils carried by a hinged or jointed tubular support adapted to serve as an inlet for steam and as an outlet for water of condensation, and arranged to move into or out of the evaporating vessel as desired, when turned about its center of motion, substantially as herein described for the purpose specified.

4. In heating or evaporating apparatus, the combination with the evaporating vessel, of heating coils, tubular supports to which the ends of said coils are connected, and fixed steam inlet and water outlet pipes to which said tubular supports are hinged or jointed substantially as herein described for the purpose specified.

5. In heating or evaporating apparatus, the combination with an evaporating apparatus provided with a lateral opening normally closed by a removable door, of heating coils, one or more pairs of tubes to which the ends of said coils are connected, and fixed steam and water plugs to which the said tubes are detachably hinged or jointed substantially as herein described.

6. In heating or evaporating apparatus, the combination with an evaporating apparatus provided with a lateral opening normally closed by a door, of a series of heating coils, tubes arranged horizontally and in proximity to the opening in said evaporating vessel and to which the ends of said heating coils are connected, and fixed vertical hollow plugs carried by said evaporating vessel and on which said tubes are detachably mounted and so as to be capable of turning thereon substantially as herein described for the purpose specified.

7. In heating or evaporating apparatus, the combination with an evaporating vessel having a lateral opening provided with a detachable cover, of pairs of connected heating coils 6, tubes 7, 7' to which the ends of said coils are detachably connected, each of said tubes being closed at one end and provided at the other end with a cap 8, tubular plugs 9 adapted to fit the caps on said tubes and each having a screw threaded stem provided with a tightening nut, and valves for controlling the passage of steam and water to and from said tubes and coils, substantially as herein described for the purposes specified.

In testimony whereof I have signed my name to this specification in the presence of two subscribing witnesses.

DONALD BARNS MORISON.

Witnesses:
T. HARRY TILLY,
    *Notary Public, West Hartlepool.*
I. B. NEWBEGIN,
    *Cashier, West Hartlepool.*